H. H. KENNEDY.
AUTOMOBILE DRIVE.
APPLICATION FILED JAN. 28, 1909.

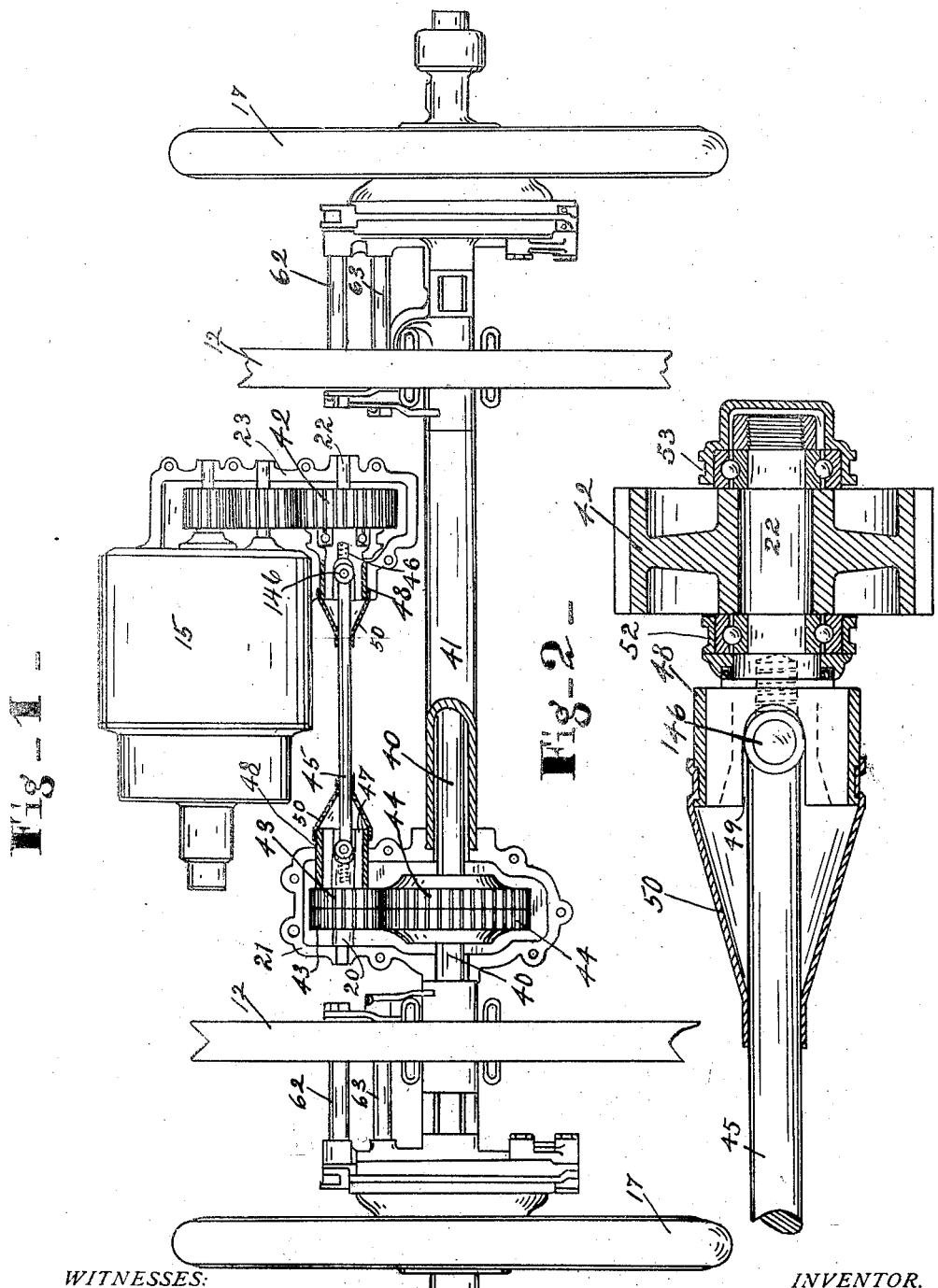

1,093,631.

Patented Apr. 21, 1914.

2 SHEETS—SHEET 2.

WITNESSES:
A. H. Edgerton
O. M. McLaughlin

INVENTOR.
HAROLD H. KENNEDY.
BY
V. H. Lockwood
ATTORNEY.

UNITED STATES PATENT OFFICE.

HAROLD H. KENNEDY, OF INDIANAPOLIS, INDIANA, ASSIGNOR TO WAVERLEY COMPANY, OF INDIANAPOLIS, INDIANA, A CORPORATION.

AUTOMOBILE-DRIVE.

1,093,631.  Specification of Letters Patent.  Patented Apr. 21, 1914.

Application filed January 28, 1909. Serial No. 474,808.

*To all whom it may concern:*

Be it known that I, HAROLD H. KENNEDY, of Indianapolis, county of Marion, and State of Indiana, have invented a certain new and useful Automobile-Drive; and I do hereby declare that the following is a full, clear, and exact description thereof, reference being had to the accompanying drawings, in which like letters refer to like parts.
The object of this invention is to improve the construction of motor vehicles, particularly with reference to the rear drive mechanism.

One feature of the invention consists in mounting the motor at one side of the axle or shaft driving the traction wheels, and providing a driving connection between the two, whereby the effectual transmission of power will not be interfered with by the vertical play or movements of either the motor or the wheel-driving axle. This particular object is accomplished by providing an intermediate pair of gears, one driven by the motor and the other driving a gear on the axle or shaft, power being transmitted between said intermediate gears by a shaft connected at each end by a universal joint.

The full nature of the invention will be understood from the accompanying drawings and the following description and claims.

Figure 3:
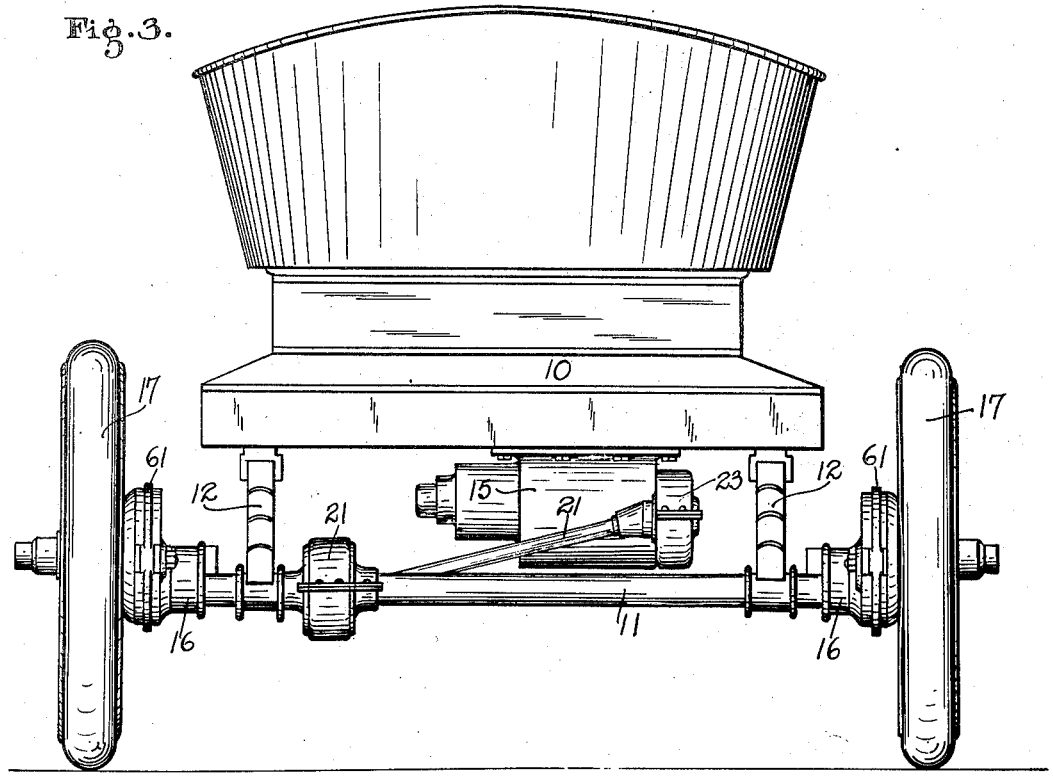
Figure 4:
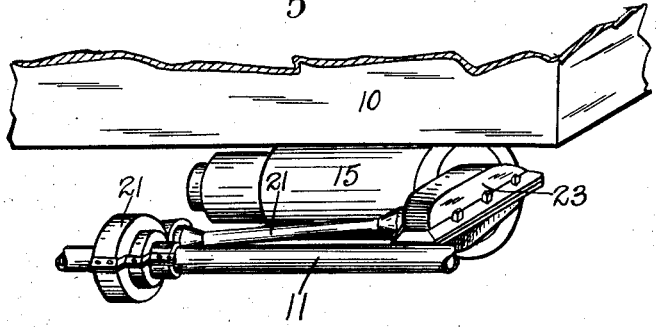

In the drawings Figure 1 is a plan view of the driving mechanism with the body of the vehicle removed, parts in horizontal section and parts broken away. Fig. 2 is an enlarged horizontal section through the intermediate gear driven by the motor as shown in Fig. 1 at the right-hand end of the shaft driven by said gear, and the connection between said gear and shaft. Fig. 3 is a rear elevation of an electric vehicle equipped with said invention with the vehicle unloaded. Fig. 4 is a perspective view of the motor, flexible shaft, gear case and axle, and part of the body, with the body somewhat loaded, parts being broken away.

In detail, the carriage body, not shown, is supported upon springs 12, which are mounted on a tubular casing 41 in which a divided axle 40 operates and on which the wheels 17 are secured. The parts 62 and 63 constitute portions of the brake mechanism, which forms no necessary part of this invention. This portion of the construction may be in any of the usual forms.

Power is transmitted to the axle 40 by gear wheels 44 secured thereon, which mesh with gear wheels 43 secured on the shaft 20 in a gear case 21. Power is transmitted to the shaft 20 from the motor 15 through a gear 42 to its shaft 22, mounted in the casing 23 and the intermediate shaft 45. The motor 15 and casing 23 are secured to the bottom of the body of the automobile, and, therefore, there is relative vertical movement of said parts as compared with the wheels 17, axle 40 and gears 43 and 44. The motor 15 is in front of, and, therefore, to one side of, the axle 40, and the construction is such that the motor and axle 40 may have their different relative vertical movements without in any wise interfering with the transmission of power from one to the other. This peculiar arrangement causes the gears 42 and 43 to have different vertical movements with relation to each other, and in order that the shaft 45 may transmit power from one to the other without interference from said relative vertical movement, it is at each end coupled with the shafts 20 and 22 by a yielding connection. To that end the right-hand portion of the shaft 20 and the left-hand portion of the shaft 22 have enlarged hollow or tubular portions 48, which are provided with longitudinal slots 49, into which the transverse ends 146 of the shaft 45 project, so that rotary movement will be transmitted by said connection and yet the ends of the shaft 45 may have longitudinal play or movement relative to the enlargement 48 of the shafts 20 and 22. Spiral springs 46, shown by dotted lines in Fig. 2, are embedded in suitable longitudinally extending recesses in the enlarged ends of the shafts 20 and 22 so as to press against the ends of the shaft 45 and take up the longitudinal play thereof during the relative vertical movements of the motor and the axle. The rotary movement of the gear 42 is transmitted to the shaft 22 and thence to the shaft 45, and from it to the shaft 20 and gears 43, as the T-shaped ends of the shaft 45, extending laterally through the enlarged ends 48 of the shafts 20 and 22, cause transmission of power. The shaft 22 is mounted in roller bearings 53. The tapering casing 50 surrounds each end of the shaft 45 and the adjacent portion of the enlarged ends 48 of the shafts 20 and 22. These casings 50 keep the dust from the mechanism. In this construction of joint there is very little, if any, loss of power in transmission, as there is very little, if any, torsional play between the parts, and the springs 46 hold the adjacent parts in proper relation to each other during the changes of the relative positions of the motor and axle.

What I claim as my invention and desire to secure by Letters Patent is:

1. An automobile including traction wheels, a dead axle supported on the same, a vehicle body, springs for supporting the body on the dead axle and rigidly secured to the axle, a gear case secured to the dead axle so as to be held in fixed position relatively thereto and the springs, a live axle within said dead axle for transmitting power to the wheels, a gear in said gear case and secured on said live axle for rotating it, an intermediate gear in said gear case for driving said axle gear, a motor mounted in connection with the vehicle body and at one side of the dead axle, a motor shaft and a flexibly and yieldingly mounted shaft parallel with said motor shaft for transmitting power between said motor shaft and one of the gears in the gear case secured to the dead axle so that it will automatically adjust itself and operate regardless of any vertical play or movement of the vehicle body or the dead axle or both.

2. An automobile including traction wheels, a dead axle supported on the same, a vehicle body, springs for supporting the body on the dead axle and rigidly secured to the axle, a gear case secured to the dead axle so as to be held in fixed position relative thereto and the springs, a live axle within said dead axle for transmitting power to the wheels, a gear in said gear case and secured on said live axle for rotating it, an intermediate gear in said gear case for driving said axle gear, a motor mounted in connection with the vehicle body and at one side of the dead axle, and a flexibly and yieldingly mounted shaft substantially parallel with said dead axle for transmitting power between said motor and one of the gears in the gear case secured to the dead axle so that it will automatically adjust itself and operate regardless of any vertical play or movement of the vehicle body or the dead axle or both.

3. An automobile including traction wheels, a dead axle supported on the same, a vehicle body, springs for supporting the body on the dead axle and rigidly secured to the axle, a gear case secured to the dead axle so as to be held in fixed position relative thereto and the springs, a live axle within said dead axle for transmitting power to the wheels, a gear in said gear case and secured on said live axle for rotating it, an intermediate gear in said gear case for driving said axle gear, a motor mounted in connection with the vehicle body and at one side of the dead axle, a gear case secured to the body, gears in said case for transmitting power from the motor, and a flexibly mounted shaft substantially parallel with said dead axle for transmitting power between one of the gears in the gear case secured to the body of the vehicle and one of the gears in the gear case secured to the dead axle, said shaft being connected with said intermediate gears at each end by a universal joint and formed so as to permit the longitudinal movement of one end of said shaft.

4. In an automobile having a frame and a driving axle, mechanism including live axle sections and a differential mechanism with a driving gear having its axis disposed transversely of the frame, a motor suspended from said frame and having its shaft transversely disposed relative to the frame, driving shafting parallel with and located between the driving axle and the motor shaft and connected at one end to said differential driving gear and extending along one side of said motor, a pair of bearings rotatably supporting said driving shafting near its other end, said bearings in turn being supported by the motor casing, and reduction gearing between the adjacent ends of the motor shaft and driving shafting.

In witness whereof, I have hereunto affixed my signature in the presence of the witnesses herein named.

HAROLD H. KENNEDY.

Witnesses:
O. M. McLaughlin,
W. M. Gentle.